United States Patent [19]
Prokai et al.

[11] 3,957,842
[45] May 18, 1976

[54] ORGANOSILICONE POLYMERS

[75] Inventors: Bela Prokai, Mahopac; Bernard Kanner, West Nyack, both of N.Y.

[73] Assignee: Union Carbide Corporation, New York, N.Y.

[22] Filed: July 27, 1974

[21] Appl. No.: 483,661

Related U.S. Application Data

[60] Division of Ser. No. 212,729, Dec. 27, 1971, Pat. No. 3,836,560, which is a continuation-in-part of Ser. No. 122,164, March 8, 1971, abandoned.

[52] U.S. Cl. .................. 260/448.2 B; 260/448.2 N; 260/448.8 R; 260/2.5 AH
[51] Int. Cl.² ..................... C07F 7/08; C07F 7/10; C07F 7/18
[58] Field of Search .............. 260/448.2 B, 448.8 R, 260/46.5 Y

[56] References Cited
UNITED STATES PATENTS

| | | | |
|---|---|---|---|
| 3,271,331 | 9/1966 | Ender | 260/448.2 B X |
| 3,280,160 | 10/1966 | Bailey | 260/448.2 B |
| 3,342,766 | 9/1967 | Huntington | 260/448.2 B X |
| 3,457,173 | 7/1969 | Pater | 260/448.2 B X |
| 3,480,583 | 11/1969 | Bailey et al. | 260/448.2 B X |
| 3,723,491 | 3/1973 | Rossmy et al. | 260/448.2 B |
| 3,790,612 | 2/1974 | Raleigh | 260/448.2 B |

*Primary Examiner*—Paul F. Shaver
*Attorney, Agent, or Firm*—Reynold J. Finnegan

[57] ABSTRACT

Linear siloxane-polyoxyalkylene $(AB)_n$ block copolymers having an average molecular weight of at least about 30,000, compositions of polyurethane-forming froths containing said copolymers, the curable froths produced from said compositions, methods for utilizing said froths as well as the cured foams and articles produced therefrom, said froths having utility in the production of molded polyurethane foam articles, foam backings for carpeting and fabrics, coatings for wire, cable and other articles, small cavity encapsulations, and the like.

10 Claims, No Drawings

ORGANOSILICONE POLYMERS

This application is a divisional of U.S. application, Ser. No. 212,729 filed Dec. 27, 1971 now U.S. Pat. No. 3,836,560, which in turn is a continuation-in-part of U.S. application, Ser. No. 122,164 filed Mar. 8, 1971, now abandoned.

This invention relates to novel organosilicone compounds. This invention also relates to novel heat curable polyurethane-forming froths having utility in the production of molded polyurethane foam articles, foam backings for carpeting and fabrics, coatings for wire, cable and other articles, small cavity encapsulations and the like. This invention further relates to curable froths produced from the novel compositions and to methods for utilizing them as well as to the cured foam and articles produced therefrom.

It has been the practice in the past manufacture of polyurethane foams to foam and cure at the same time by using relatively fast-acting components so that the gas bubbles generated to form the cells of the foam would be swiftly entrapped. In order to do this, the curing or polymerization must proceed at high speed with an almost instantaneous, steep increase in viscosity. Since bubble formation or expansion as well as curing were taking place simultaneously, it was very difficult to control the size of an article formed by such methods as knife coating before it set and became unworkable. Hence molding methods are widely used commercially to control the size of articles produced from polyurethane foams. Exemplary of such practice is U.S. Pat. No. 3,278,465 which discloses the use of water or a low boiling liquid as blowing agents and ionic polysiloxanes as foam stabilizers.

Moreover, as noted in Hankins U.S. Pat. No. 3,046,177 and in Voelker U.S. Pat. No. 3,181,199, "Unexpected irregularities in performance make the long distance movement of polyurethane froth highly disadvantageous". Also, when the expanding mixture is applied to rough surfaces such as the back of a carpet, it would expand to substantially the same degree throughout and reproduce a rough or uneven surface on the resulting foam. Both of the above-mentioned patents teach the immediate formation and shaping of the foam.

The prior art is further exemplified by Hoppe U.S. Pat. No. 3,188,296 wherein polyurethane-forming reactants are so fast-acting one must be injected into the other under extremely high pressure, such as 15,000 psi and air under pressure must be tangentially injected in special equipment to produce a turbulent flow. The air then acts as a nucleating agent for the forming gas produced by the chemical reaction. The rate of reaction is so fast that, as stated in the patent, the mixing normally takes place in 0.5 to 25 seconds.

Violent mixing of the reactive ingredients and catalyst is employed in the process disclosed in the Hankins U.S. Pat. No. 3,046,177. In the process, the polymerization begins almost instantaneously in the special mixer and the reacting mixture is almost instantaneously discharged onto a mold surface where it is simultaneously distributed and shaped with air jets as it is in its final stages of expansion.

In another case, as described in Knox, U.S. Pat. No. 3,108,975, the froth is first formed by decompression of the reactants and air under high pressure and then mixed with the other reactant and cured or it is first formed by decompression of both reactants and highly pressurized air and then mixed with the catalyst or cross-linker and cured.

In still another case, as described by R. E. Knox, Chem. Eng. Prog. 57, No. 10,40 (1961), a volatile liquid such as dichlorofluoromethane is incorporated into the polyurethane-forming mixture which is then dispensed under pressure from a pressure mixer. Frothing of the mixture occurs when the volatile liquid is vaporized as a result of the reduction of pressure as the mixture is discharged from the mixer.

More recently as noted in Belgium Patent 745,227 which corresponds to U.S. application Ser. No. 795,674, filed Jan. 31, 1969, now abandoned, heat curable, polyurethane-forming froths have been developed which are substantially structurally and chemically stable but workable at ambient conditions, i.e., capable of being transported for considerable distances and/or temporarily stored and then shaped and formed, which can be rapidly cured to a tack-free condition when desired by the application of heat, as by raising the temperature of the froth to 70°C. or more. Such froths comprise a polyisocyanate, an active hydrogen compound reactive with said polyisocyanate to form a polyurethane and a surfactant for structurally stabilizing said froth, preferably an organosilicone surfactant. Various organosilicone surfactants are proposed, but the organosilicone surfactants used in this invention are not specifically disclosed or utilized in said Belgium patent.

Thus according to the present invention there is provided a novel heat curable polyurethane forming froth which is substantially structurally and chemically stable but workable at ambient conditions, i.e., capable of being transported for considerable distances and/or temporarily stored and then shaped and formed, and can still be rapidly cured to a tack-free condition when desired by the application of heat, as by raising the temperature of the froth to 70°C. or more. The novel froths preferably contain, as the substantially non-aqueous liquid phase, stable polyurethane-forming components, i.e., components such as a polyisocyanate and an active hydrogen compound, that are substantially reactive with each other, in the presence of catalysts, if any, contained therein, only at a temperature of at least about 70°C. or higher or at ambient temperatures in the presence of a fast cure promoting catalyst and an organic polysiloxane surfactant as described below for stabilizing the structure of the froth until it is cured as by heating. The gas or bubble phase of the novel froths can be any inert gas, such as air, uniformly dispersed throughout the liquid phase in the form of tiny bubbles or cells.

The froth is generally produced by mechanically beating air into the appropriate foaming media and is subsequently cured by the application of heat, or at ambient temperatures by a fast-cure promoting catalyst to resulting polyurethane foams having fine uniform cell structures and low densities.

The organic polysiloxane surfactants which can be employed to stabilize the heat curable froths of this invention are high molecular weight linear siloxane-polyoxyalkylene block copolymers of the $(AB)_n$ type wherein $n$ is an integer, each A is a siloxane block and each B is a polyoxyalkylene block said blocks being linked by a divalent atom or a divalent group.

Said high molecular weight siloxane-polyoxyalkylene block copolymers may be divided into two classes 1. hydrolyzable block copolymers, i.e., those wherein the siloxane blocks and the polyoxyalkylene blocks are linked by silicon to oxygen to carbon linkages, and 2. non-hydrolyzable (hydrolytically stable) block copolymers, i.e., those wherein the siloxane blocks and polyoxyalkylene blocks are linked by silicon to carbon linkages. The preferred copolymer surfactants are those of the hydrolyzable type.

The siloxane block in the linear copolymers of this invention is a linear siloxane polymer or chain of recurring siloxane units, ($-R_2SiO-$), and is illusarated by the average formula $+R_2SiO+_x$, for the hydrolyzable block copolymers and by the average formula $+R_2SiO+_a R_2Si-$ for the non-hydrolyzable block copolymers, wherein R is a monovalent hydrocarbon group, $x$ is an integer of at least 7 and $a$ is an integer of at least 6. The average molecular weight of each siloxane block of said siloxane-polyoxyalkylene copolymers ranges from about 500 to about 10,000. Moreover, the monovalent hydrocarbon radicals need not be identical throughout the siloxane block, but can differ from siloxane unit to siloxane unit and can even be different within a single siloxane unit.

Illustrative of the monovalent hydrocarbon groups that are represented by R above are alkyl groups (such as, methyl, ethyl, propyl, isopropyl, butyl, pentyl, hexyl, octyl, decyl, dodecyl, octadecyl, eicosyl, and the like); aryl groups (such as, phenyl, naphthyl, and the like); aralkyl groups (such as, benzyl, phenylethyl, and the like); alkaryl groups (such as, tolyl, xylyl, and the like); and cycloalkyl groups (such as cyclohexyl, and the like). In the hydrolyzable copolymers R can also represent alkenyl groups (such as, vinyl, allyl, and the like) and cycloalkenyl groups such as cyclohexenyl and the like). If desired, such groups can contain substituents so long as they do not adversely effect the performance for which the copolymers are intended. Preferably said hydrocarbon radicals are free from aliphatic unsaturation and contain from 1 to 20 carbon atoms, while lower alkyl and phenyl radicals are most preferred. Especially preferred siloxane blocks are those consisting essentially of dimethylsiloxane units, i.e. $+Me_2SiO+_x$ wherein $x$ is an integer of at least 7 and $+Me_2SiO+_aMe_2Si-$ wherein $a$ is an integer of at least 6.

The polyoxyalkylene block of said linear block copolymers is a linear predominantly oxyalkylene polymer comprised of recurring oxyalkylene units, ($-C_nH_{2n}O-$). and is illustrated by the average formula $+C_nH_{2n}O+_y$, wherein $n$ is an integer from 2 to 4 inclusive and y is an integer of at least four. The average molecular weight of each polyoxyalkylene block of said siloxane-polyoxyalkylene copolymers ranges from about 300 to about 10,000. Moreover, the oxyalkylene units are not necessarily identical throughout the polyoxyalkylene block, but can differ from unit to unit. A polyoxyalkylene block, for example, can be comprised of oxyethylene units, ($-C_2H_4O-$); oxypropylene units ($-C_3H_6O-$); or oxybutylene units, ($-C_4H_8O-$); or mixtures thereof. Preferably the polyoxyalkylene block consists essentially of oxyethylene units of oxypropylene units and most preferably of a mixture oxyethylene and oxypropylene units having an oxyethylene content of about 30 to about 75 weight per cent and an oxypropylene content of about 70 to about 25 weight per cent, based on the total amount of oxyalkylene units in the block.

As is apparent to one skilled in the art at least one end of each polyoxyalkylene block of the linear $(AB)_n$ block copolymers is linked to a siloxane block by a divalent atom or a divalent group. This linkage between the two different blocks is readily apparent and determined by the reaction employed to produce the siloxane-polyoxyalkylene block copolymer, as explained more fully below. Moreover, as is also apparent to one skilled in the art, the linear $(AB)_n$ block copolymers are endblocked. Such endblockers are inconsequential in terms of their amount of and effect on the block copolymers and are normally and preferably the residual reactive groups of the polyoxyalkylene polymer and/or siloxane polymer reactants used to produce the linear block $(AB)_n$ copolymers. For example, the linear hydrolyzable $(AB)_n$ block copolymers of this invention can be prepared by the polycondensation reaction of polyoxyalkylene diols with dialkylamino terminated dialkylsiloxane fluids thus resulting in a copolymer wherein the polyoxyalkylene blocks and siloxane blocks are linked through an oxygen atom (silicon to oxygen to carbon linkages) and the endblocking groups being selected from the group consisting of hydroxy and/or dialkylamino(dialkyl)siloxy groups. Of course it is to be understood that the linear block copolymers may be "capped" by converting such reactive groups to less reactive groups (e.g. to convert dimethyl amino groups to alkoxy groups) by known methods. Moreover, where a catalyst is used in the production of the linear block copolymer, the block copolymer may be possibly endblocked with a catalyst residue. Endblocking by impurities is also a possibility, e.g. by monofunctional impurities, e.g. monols, which might be present in the materials used to prepare the copolymers of this invention. To the same extent it is understood that the instant linear copolymers encompass any branching due to trifunctional impurities, e.g. triols.

The linear siloxane-polyoxyalkylene block copolymers can have an average molecular weight of about 30,000 on up to about 250,000 or higher. The upper limit is not critical, its value merely being dependent upon the practicalities of process limitations in preparing such high molecular weight $(AB)_n$ type polymers. The siloxane blocks of said block copolymers can constitute about 20 to about 50 weight per cent of the block copolymer, while the polyoxyalkylene blocks can constitute about 80 to about 50 weight per cent of the block copolymer. Preferably the hydrolyzable type $(AB)_n$ polymers have an average molecular weight of at least about 65,000 and most preferably at least about 100,000, while the non-hydrolyzable type $(AB)_n$ polymers have an average molecular weight of at least about 30,000.

It is to be understood that while said $(AB)_n$ block copolymers of this invention can be discrete chemical compounds they are usually mixtures of various discrete block copolymers species due at least in part to the fact that the siloxane and polyoxyalkylene reactants used to produce said $(AB)_n$ block copolymers are themselves usually mixtures. Moreover, while a single $(AB)_n$ block copolymer can be employed as the froth and from stabilizer, mixtures of two or more different $(AB)_n$ block copolymers can also be employed if desired.

More specifically said hydrolyzable linear siloxane-polyoxyalkylene block copolymers preferably consist essentially of (A) at least four linear siloxane blocks consisting essentially of dihydrocarbylsiloxane groups; and (B) at least four linear polyoxyalkylene blocks, said siloxane blocks and polyoxyalkylene blocks being linked by silicon to oxygen to carbon linkages, the average molecular weight of each siloxane block being from about 500 to about 10,000, the average molecular weight of each polyoxyalkylene block being from about 300 to about 10,000, the siloxane blocks constituting from about 20 to about 50 weight per cent of the block copolymer, the polyoxyalkylene blocks constituting from about 80 to about 50 weight per cent of the block copolymer and the block copolymer having an average molecular weight of at least about 65,000.

Thus the preferred high molecular weight linear hydrolyzable siloxane polyoxyalkylene block copolymers can be represented by the average formula $$[(R_2SiO)_x(C_nH_{2n}O)_y]_d$$

wherein R represents a monovalent hydrocarbon radical free from aliphatic unsaturation; $n$ is an integer of from 2 to 4 inclusive; $x$ is an integer of at least 7; $y$ is an integer of at least 4; $d$ is an integer of at least 4; the average molecular weight of each siloxane block being from about 500 to about 10,000; the average molecular weight of each polyoxyalkylene block being from about 300 to about 10,000; said siloxane and polyoxyalkylene blocks being linked by the silicon to oxygen to carbon linkages; the siloxane blocks constituting from about 20 to about 50 weight per cent of the copolymer; the polyoxyalkylene blocks constituting about 80 to about 50 weight per cent of the copolymer; and the block copolymer having an average molecular weight of at least about 65,000.

Of course it is understood that the chosen values of R, $n$, $x$, $y$ and $d$ must be such, that in any given block copolymer as defined herein, they coincide with the particular average weight values of the siloxane blocks, the polyoxyalkylene blocks and the copolymer itself.

It has been further found, according to the instant invention, that a more specific class of the novel high molecular weight linear hydrolyzable siloxanepolyoxyalkylene block copolymers, as defined herein, possess unique properties which render them far superior to certain heretofore known siloxanes of a similar nature, as well as to other linear hydrolyzable siloxane-polyoxyalkylene block copolymers falling outside of said class, in providing for the production of high quality cured polyurethane foam via the preferred mechanical frothing compositions and techniques disclosed herein. The use of these especially preferred high molecular weight linear hydrolyzable siloxane-polyoxyalkylene block copolymers in said preferred systems have been found not only to provide excellent stability to the heat curable froth, but apparently aid in the production of high quality cured polyurethane foam having far lower densities and good overall properties, such as tensile strength, elongation, finer cell structure and smoother unrippled skin. Moreover, said high molecular weight hydrolyzable block copolymers appear to be generally far more potent or powerful in that very low amounts of said copolymers are normally required to help achieve the desired high quality cured polyurethane foam.

These most preferred high molecular weight linear hydrolyzable siloxane-polyoxyalkylene block copolymers can be represented by the average formula $$[(R_2SiO)_x(C_nH_{2n}O)_y]_d$$

wherein R represens a monovalent hydrocarbon radical free from aliphatic unsaturation, preferably lower alkyl, especially methyl; wherein $(C_nH_{2n}O)$ represents a mixture consisting of about 30 to about 75 weight per cent, preferably about 50 weight per cent of oxyethylene groups and about 70 to about 25 weight per cent, preferably about 50 weight per cent of oxypropylene groups wherein $x$ is an integer of at least 7; wherein $y$ is an integer of at least 4; wherein $d$ is an integer of at least 4, wherein the average molecular weight of each siloxane block ranges from about 500 to about 10,000, preferably about 500 to about 5,000 and most preferably about 1,000 to about 3,500; wherein the average molecular weight of each polyoxyalkylene block ranges from about 300 to about 10,000, preferably about 1,000 to about 5,000 and most preferably about 2,000 to about 3,500; wherein the siloxane blocks constitute about 25 to about 50 weight per cent, preferably about 30 to about 45 weight per cent of the copolymer; wherein the polyoxyalkylene blocks constitute about 75 to about 50 weight per cent, preferably about 70 to about 55 weight per cent of the copolymer; and wherein the block copolymer has an average molecular weight of at least about 65,000, preferably at least about 100,000, up to about 250,000 or higher.

The linear $(AB)_n$ siloxane-polyoxyalkylene block copolymers belonging to the hydrolyzable class discussed above are prepared by the polycondensation of polyoxyalkylene diols with amino terminated dihydrocarbyl siloxane fluids. The basic reaction may be illustrated by the following skeletal equation ≡SiY + HOC≡ → ≡SiOC≡ + HY wherein Y is an amino group, such as —NH₂, —NHZ, and NZ₂, wherein Z is a monovalent hydrocarbon radical. Preferably Y is a dimethylamino radical.

More specifically the high molecular weight linear hydrolyzable $(AB)_n$ type siloxane-polyoxyalkylene block copolymers can be simply and smoothly obtained by reacting a dimethylamino-terminated dihydrocarbylsiloxane with an equimolar amount of a polyoxyalkylene diol at a temperature from 50° to 400°C, preferably from about 105° to about 200°C. at atmospheric pressure in the absence of added catalyst.

In order to insure a maximum degree of polymerization and efficiency the reactants should be employed in exactly equimolar amounts or as near to this as possible for as one deviates from the use of equimolar amounts the block copolymer product will not have as high a molecular weight as desired. Likewise it is preferred to employ the siloxane polymer and polyoxyalkylene diol reactants in as pure a form as possible and therefore it may often be desirable to sparge and dehydrate the reactants prior to use in order to avoid hazy and/or contaminated products. However monofunctional or trifunctional impurities or mixtures thereof up to about three percent may be present.

The reaction is also preferably conducted in the presence of an inert organic solvent. Any suitable inert organic solvent or mixtures thereof can be employed. Illustrative solvents include such compounds as aromatic hydrocarbons, chlorinated aromatic hydrocarbons, and alkylated aromatic hydrocarbons having boiling points in the range of about 150 to 300°C., such as orthodichlorobenzene, mono-chlorobenzene, toluene, xylene, and the like; ethers, such as diethyl CARBITOL, dibutyl CARBITOL, diethoxy tetraglycol and the like. Unlike the main reactants the inert organic solvents may be and generally are employed in their commercial form without further purification prior to use so long as they do not contain a substantial amount of active hydrogen impurities.

If desired the reaction may also be conducted under reduced pressure and/or in the presence of a catalytic amount (e.g., 0.01 to 2 weight per cent with reference to the total quantity of reactants) of a condensation catalyst or mixtures thereof, such as the carboxylic acids, including trifluoroacetic acid, perfluorobutynic acid, monochloroacetic acid and the like. The removal or neutralization of the acid catalyst if employed in the condensation reaction is essential to provide stable $(AB)_n$ block copolymers. However, the reaction can take place fairly rapidly without the addition of such catalysts. The preferred reactive process for preparing the linear high molecular weight hydrolyzable block copolymers of this invention may be more specifically illustrated by the following example.

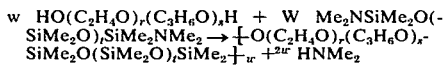

wherein Me represents a methyl radical, $r$, $s$ and $t$ are integers and $w$ is an integer of at least four. The desired linear block copolymer product can be conveniently and easily separated from the dimethyl amine by-product, e.g. by sparging the volatile amine.

Moreover, an additional feature of the instant invention is that while the linear block copolymer can be separated by removing the solvent under a vacuum at moderate temperatures (75°–150°C.) such is not necessary since solvent solutions of the high molecular weight linear hydrolyzable $(AB)_n$ siloxane-polyoxyalkylene block copolymers of this invention can also be used as stabilizers for the heat curable froths of this invention, thereby rendering handling of the very high viscosity copolymers easier by the reduced viscosity of the solution.

Of course as is readily apparent ot those skilled in the art the choice of the particular dimethylamino terminated siloxane polymer and polyoxyalkylene diol reactant employed merely depends on the particular block copolymer desired. Moreover the final molecular weight of the block copolymer product is also a function of reaction time and temperature. Thus those skilled in the art will readily recognize that it is obvious that an extremely large number and variety of block copolymers can be predetermined and selectively prepared by routine experimentation, which permits tailoring the compositions and products made therefrom to individual specifications and needs rather than vice versa.

The amino terminated dihydrocarbyl siloxane polymers for use as the starting materials in the above process, as well as methods for their preparation are well known in the art as witnessed for example by U.S. Pat. Nos. 3,467,686 and 3,530,092. They can also be prepared by equilibrating lower molecular weight amino terminated dihydrocarbyl fluids with dihydrocarbyl cyclic siloxanes in the presence of base catalysts by standard well known procedures. The ratio of amino-endblocked siloxy units to dihydrocarbyl siloxy units determines the final molecular weight of the products.

The polyoxyalkylene diol which is the other starting material or reactant in the production of the above linear block (AB) copolymers includes the polyoxyethylene diols, the polyoxypropylene diols, the polyoxybutylene diols, mixed oxyethyleneoxypropylene diols, and the like. Said polyoxyalkylene diols as well as methods for the manufacture are well known in the art as witnessed, for example by U.S. Pat. No. 3,480,583, the entire disclosure of which patent is incorporated herein by reference thereto. Said diols are widely available commercially and are conveniently prepared by reacting the corresponding alkylene oxide, or oxides with a diol starter by standard procedures. When more than one alkylene oxide is employed, they can be added to the diol starter sequentially, or they can be first admixed and the admixture added to the diol starter, or they can be added to the diol starter in any other manner. Of course it is to be understood that it is also well known that polyoxyalkylene diols can be made by reacting alkylene oxides with other compounds having labile hydrogen atoms, such as alkyl and aryl dithiols, alkyl and aryl diamines, aryl diols, and the like, e.g., ethylenedithiol, hexamethylene diamine, m-phenylene diamine, 4,4′dihydroxy-diphenyl propane, and the like. Such polyoxyalkylene diols made from these diverse starting materials also form block copolymers of the same general type with the siloxane polymers and are to be included within the term polyoxyalkylene block as used herein, since the starting fragment of such polyoxyalkylene diol forms an insignificant fraction of the block copolymer.

Other possible routes that may be feasible to prepare the high molecular weight linear hydrolyzable $(AB)_n$ block copolymers are the polycondensation of polyoxyalkylene diols with halo terminated dihydrocarbyl siloxane fluids in the presence of an acid acceptor or by the polycondensation of polyoxyalkylene diols with hydrogen terminated dihydrocarbyl siloxane fluids in the presence of a suitable catalyst. These basic reactions may be illustrated by the following equations

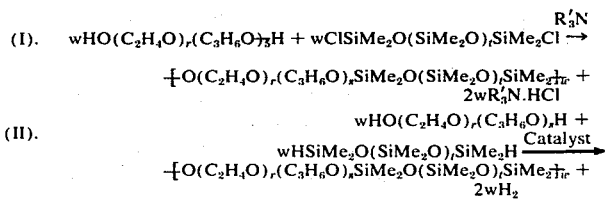

wherein Me, $r$, $s$, $t$ and $w$ are the same as defined above, wherein $R'_3N$ is a suitable amine acid acceptor, e.g. triethylamine, pyridine, dimethylamine, and the like and wherein the catalyst is any suitable well known organometallic derivative of tin, lead, platinum and the like. It should, however, be noted that both routes (I) and (II) are not as attractive for high molecular weight $(AB)_n$ copolymer preparation due to the undesirable handling and separation amine acid by-product of (I) and the fact that the catalyst of (II) could cause simultaneous rearrangement of the siloxane skeleton under some conditions.

More specifically the above mentioned non-hydrolyzable (hydrolytically stable) linear siloxane-polyoxyalkylene block copolymers consist essentially of (A) at least four linear siloxane blocks consisting essentially of dihydrocarbylsiloxane groups; and (B) at least four linear polyoxyalkylene blocks, said siloxane blocks and polyoxyalkylene blocks being linked by silicon to carbon linkages; the average molecular weight of each siloxane block being from about 500 to about 10,000 the average molecular weight of each polyoxyalkylene block being from about 300 to about 10,000, the siloxane blocks constituting from about 20 to about 50 weight per cent of the block copolymer, the polyoxyalkylene blocks constituting from about 80 to about 50 weight per cent of the block copolymer and the block copolymer having an average molecular weight of at least about 30,000.

Thus the preferred linear non-hydrolyzable siloxane-polyoxyalkylene block copolymers can be represented by the average formula $$([Y(R_2SiO)_nR_2SiYO][(C_nH_{2n}O)_a])_d$$

wherein R represents a monovalent hydrocarbon radical free from aliphatic unsaturation, $n$ is an integer of from 2 to 4 inclusive; $a$ is an integer of at least 6; $y$ is an integer of at least 4; $d$ is an integer of at least 4; Y represents a divalent organic group attached to the adjacent silicon atom by a carbon to silicon bond and to the polyoxyalkylene block by an oxygen atom; the average molecular weight of each siloxane block being from about 500 to about 10,000; the average molecular weight of each polyoxyalkylene block being from about 300 to about 10,000; said siloxane blocks constituting from about 20 to about 50 weight per cent of the copolymer; the polyoxyalkylene blocks constituting about 80 to about 50 weight per cent of the copolymer; and the block copolymer having an average molecular weight of at least about 30,000.

The exemplary radicals, as well as their preferred values, represented by R and $(C_nH_{2n}O)$ in the above formula of said non-hydrolyzable block copolymers are the same as those previously defined above for the hydrolyzable copolymers. Of course it is understood that the chosen values of R, $n$, $a$, $y$ and $d$ must be such, that in any given block copolymer as defined herein, they coincide with the particular average weight values of the siloxane blocks, the polyoxyalkylene blocks and the copolymer itself.

As pointed out above, the linkage between the two different blocks is a divalent organic group attached to the adjacent silicon atom by a carbon to silicon bond and to the polyoxyalkylene block by an oxygen atom. Such linkages represented by Y above are readily apparent and determined by the reaction employed to produce the siloxane-polyoxyalkylene block copolymer as explained more fully below. Moreover, as is also apparent to one skilled in the art, these linear $(AB)_n$ block copolymers are also endblocked, generally with the residual reactive groups of the reactants used to produce the linear block $(AB)_n$ copolymers. For example the linear non-hydrolyzable $(AB)_n$ block copolymers of this invention can be prepared by platinum catalyzed hydrosilation of allyl terminated polyethers with SiH-terminated dialkylsiloxane fluids thus resulting in a copolymer wherein the polyoxyalkylene blocks are linked through silicon to carbon to oxygen linkages (i.e. a propyleneoxy group) and the endblocking groups being selected from the group consisting of allyl, propenyl and/or hydrogen (dialkyl) siloxy groups.

Illustrative of the divalent organic groups represented by Y in the above formula are such groups as

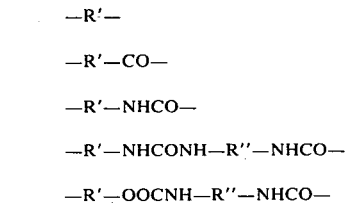

and the like, wherein R' is a divalent alkylene radical such as ethylene, propylene, butylene and the like; and R'' represents a divalent alkylene group, e.g. R', or a divalent arylene group, e.g. $—C_6H_4—$; $—C_6H_4—C_6H_4—$; $—C_6H_4—CH_2—C_6H_4—$, $—C_6H_4—CH(CH_3)_2—C_6H_4—$; and the like, preferably R'' is a phenylene radical, i.e. $—C_6H_4—$. Illustrative of the more preferred examples of said divalent organic groups are $—CH_2CH_2—$; $—CH_2CH_2CH_2—$; $—CH_2CH_2CH_2CH_2—$; $—(CH_2)_2CO—$; $—(CH_2)_3NHCO—$; $—(CH_2)_3NHCONHC_6H_4NHCO—$; $—(CH_2)_3OOCNHC_6H_4NHCO—$; and the like. Most preferably Y is a divalent alkylene group, especially $—CH_2CH_2CH_2—$.

The linear $(AB)_n$ siloxane-polyoxyalkylene block copolymers belonging to the non-hydrolyzable class discussed above can be prepared by reacting a polyoxyalkylene compound having reactive end groups with a dihydrocarbyl siloxane fluid having end groups reactive with the reactive end groups of the polyoxyalkylene compound. As previously reported the nature of these reactive groups determines the structure of the divalent organic group represented by Y above, the nature of the end blocking groups of the product of course being generaly selected from the end groups of the reactants involved. Such reactions can be illustrated by the following equations

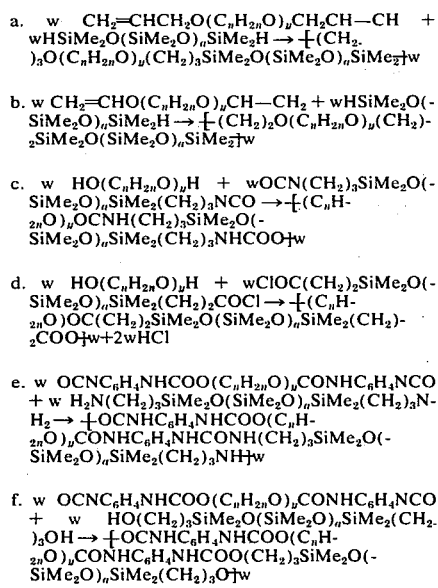

wherein Me represents a methyl radical; $n$ is an integer of from 2 to 4 inclusive; $a$ is an integer of at least 5; $y$ is an integer of at least 4 and $w$ is an integer of at least 4.

In the above equations the first reactive group represents a reactive group of the polyoxyalkylene polymer reactant and the second reactive group represents a reactive group of the siloxane group. Of course it is understood that there are other oganofunctional siloxanes and functionally-terminated polyethers which would be readily apparent to one skilled in the art that may undergo similar reactions to give the non-hydrolyzable $(AB)_n$-type copolymers. In general, the known reaction conditions for effecting the reaction between the reactive groups of the above equations can be used in producing the block copolymers. The reactants and/or methods for their preparation are also well known in the art. For example, the polyoxyalkylene diols in equations (c) and (d) have already been discussed above. The hydrogen terminated siloxanes in equations (a) and (b) are well known and easily prepared by equilibration, e.g. equilibrating $HMe_2SiOSiMe_2H$ with a mixture of hexamethylcyclotrisiloxane and/or octamethylcyclotetra siloxane. The polyoxyalkylene compounds of equations (e) and (f) can be conveniently produced by reacting a selected polyoxyalkylene diol with the selected isocyanate terminated compound. In equation (a) the olefinically terminated polyoxyalkylene compounds can be prepared by converting allyl started-hydroxyl-endblocked polyethers to alkoxides with, e.g. sodium methylate and subsequent reaction with allyl chloride, while the divinyl polyethers of equation (b) can be prepared, e.g. by reacting hydroxy terminated polyoxyalkylene ethers with acetylene, $(HC\equiv CH)$, in the presence of an appropriate catalyst by conventional methods. The organofunctional siloxanes of equation (c) can be prepared by reacting, e.g. linear hydrogen terminated tetramethyl disiloxane with $CH_2=CHCH_2NHCOOMe$ to produce a linear terminated $—(CH_2)_3NHCOOMe$ disiloxane which is then equilibrated with hexamethylcyclotrisiloxane and/or octamethylcyclotetrasiloxane in the presence of an amine catalyst and the resultant product uncapped by heat in the presence of an appropriate catalyst, e.g. tin to produce the desired $—(CH_2)_3NCO$ terminated siloxane polymer reactant. Likewise the organofunctional siloxanes of equations (d) and (e) can be prepared e.g. by reacting hydrogen terminated tetramethylsiloxane with $CH_2=CHCH_2COCl$ or $CH_2=CHCH_2NH_2$ in the presence of a platinum catalyst and equilibrating the products with hexamethylcyclotrisiloxane and/or octamethylcyclotetrasiloxane by conventional methods in the presence of an appropriate catalyst. The hydroxy terminated siloxanes of equation (f) as well as methods for their preparation are of course well known in the art.

Of course it is to be understood that the above equations represent a process in which 1:1 stoichiometry of reactants is involved and which if desired can be carried out in the presence of inert organic solvents such as those discussed above for the hydrolyzable block copolymers. Obviously solvents reactive with the reactants under the conditions of the process should not be used. Preferably the main reactants are employed in as pure as form as possible. The rate of reaction and temperature will of course be determined by the reactants involved and the product desired. Thus conventional conditions such as temperatures, pressures, catalysts and means for removal of any by-products are generally applicable.

This preferred method for preparing non-hydrolyzable linear $(AB)_n$ silicone-polyoxyalkylene block copolymers having average molecular weights ranging from at least about 30,000 to about 60,000 involves the platinum catalyzed hydrosilation of allyl terminated polyethers with SiH-terminated dihydrocarbyl siloxane fluids. Of course it is understood that the reactants are preferably in as pure as form as possible and that the general process requires equimolar quantities or as near to this as possible, since deviations from the 1:1 stoichiometry will not yield as high a molecular weight block copolymer as desired. However, when allyl terminated polyalkylene compounds are used an excess of said allyl compound may be desirable to allow for isomerization of the allyl group to propenyl.

As reported above the starting hydrosiloxanes can be prepared by standard procedures, such as the equilibration of lower molecular weight hydrogen terminated siloxanes (e.g. $HMe_2SiMe_2H$ and the like) with cyclic siloxanes (e.g. $(Me_2SiO)_3$, $(Me_2SiO)_4$ and the like as well as mixtures thereof) in the presence of any suitable conventional acid catalyst (e.g. sulfuric acid, trifluoromethyl sulfonic acid, and the like). The ratio of dimethylhydrogen siloxy units $(HMe_2SiO_{1/2})$ to dimethyl siloxy units is important of course, since it generally determines the molecular weight of the starting siloxane reactant.

As also reported above the allyl terminated polyethers can be prepared by conversion of allyl-started-hydroxyl-endblocked polyethers to alkoxides with e.g. sodium methylate, sodium hydroxide or sodium metal and the like and subsequent reaction with allyl chloride. The polyoxyalkylene portion of said allyl terminated polyethers are of course represented by the polyoxyalkylene diols discussed above.

The general reaction is carried out in the presence of any conventional platinum catalyst. Such catalysts are well known in the art, chloroplatinic acid is particularly effective. The catalyst is generally conveniently added as a solution via the use of conventional inert organic liquid, such as tetrahydrofuran, ethanol, butanol or mixtures, such as ethanol-ethylene glycol dimethyl ether, and the like. A preferred concentration of catalyst based on the total weights of siloxane and olefinic polyether is about 5 to about 50 parts per million, although higher and lower concentrations obviously may be used.

An inert organic solvent for the reactants can be used if desired. Useful solvents include for example, those discussed above, preferably aromatic hydrocarbons e.g. toluene, xylene; ethers; and the like, the choice of which should, of course, be adapted to the temperature of the process.

In carrying out the process it is generally preferred to mix all of the ingredients together at about room temperature (25°C) and allow the reaction to proceed at elevated temperatures, preferably about 60°C. to about 150°C. Lower or higher temperatures up to 200°C. can be employed, but there normally is no advantage. Likewise the reaction is generally conducted at atmospheric pressures, although other pressures could be used if desired. The removal or neutralization of the platinium catayst, e.g. chloroplatinic acid is desirable and can be accomplished in any conventional manner.

Under neutral conditions the block copolymers are stable and while they can be easily separated from the inert organic solvent, if employed, by vacuum stripping or sparging such is not necessary since solvent solutions of the non-hydrolyzable high molecular weight linear $(AB)_n$ siloxane-polyoxyalkylene block copolymers of this invention can also be used as stabilizers for the heat curable froths of this invention.

Of course as is readily apparent to those skilled in the art the choice of the particular hydrogen terminated siloxane polymer and allyl terminated polyoxyalkylene diol reactant merely depends on the particular block copolymer desired. Moreover the final molecular weight of the block copolymer product is also a function of reaction time and temperature. Thus those skilled in the art will readily recognize that it is obvious that an extremely large number and variety of block copolymers can be predetermined and selectively prepared by routine experimentation, which permits tailoring the compositions and products made therefrom to individual specifications and needs rather than vice versa.

A more specific class of the novel high molecular weight linear non-hydrolyzable siloxane-polyoxyalkylene block copolymers, as defined herein, are especially suitable in providing for the production of high quality cured polyurethane foam via the preferred mechanical frothing compositions and techniques disclosed herein. The use of these especially preferred high molecular weight linear non-hydrolyzable siloxane-polyoxyalkylene block copolymers in said preferred systems have been found not only to provide excellent stability to the heat curable polyurethane froth, but apparently aid in the production of high quality cured polyurethane foam having far lower densities and good overall properties, such as tensile strength, elongation, finer cell structure and smoother unrippled skin. Moreover, said high molecular weight non-hydrolyzable block copolymers appear to be generally far more potent or powerful in that very low amounts of said copolymers are normally required to help achieve the desired high quality cured polyurethane foam.

These most preferred high molecular weight linear non-hydrolyzable siloxane-polyoxyalkylene block copolymers can be represented by the average formula:

$$(\{Y(R_2SiO)_aR_2SiYO\}[(C_nH_{2n}O)_y])_d$$

wherein R represents a monovalent hydrocarbon radical free from aliphatic unsaturation, preferably lower alkyl, especially methyl, wherein $(C_nH_{2n}O)$ represents a mixture consisting of about 30 to about 75 weight per cent, preferably about 50 weight per cent of oxyethylene groups and about 70 to about 25 weight per cent, preferably about 50 weight per cent of oxypropylene groups; wherein Y represents a divalent organic group attached to the adjacent silicon atom by a carbon to silicon bond and to the polyoxyalkylene block by an oxygen atom, preferably a divalent alkylene group having from 2 to 4 carbon atoms, especially —CH$_2$CH$_2$CH$_2$—; wherein $a$ is an integer of at least 6; wherein $y$ is an integer of at least 4, wherein $d$ is an integer of at least 4; wherein the average molecular weight of each siloxane block ranges from about 500 to about 10,000 preferably about 500 to about 5,000 and most preferably about 1000 to about 3,500 wherein the average molecular weight of each polyoxyalkylene block ranges from about 300 to about 10,000, preferably about 1,000 to about 5,000 and most preferably about 2,000 to about 3,500; wherein the siloxane blocks constitute about 25 to about 50 weight per cent, preferably about 30 to about 45 weight per cent of the copolymer; wherein the polyoxyalkylene blocks constitute about 75 to about 50 weight per cent, preferably about 70 to about 55 weight per cent of the copolymer; and wherein the block copolymer has an average molecular weight of at least about 35,000 up to about 60,000.

The amount of said hydrolyzable or non hydrolyzable linear high molecular weight siloxane polyoxyalkylene block copolymers of this invention employed as the froth and foam stabilizer in this invention can vary over a wide range, e.g., from about 0.2 weight parts to 10 weight parts or greater per hundred weight parts of the active hydrogen component. There is no commensurate advantage to using amounts of said block copolymers less than 0.2 or greater than about 10 weight parts on the same basis. Preferably, the amount of said block copolymers present in the froth and foam formulations varies from about 0.5 weight part to about 6.0 weight parts on the same basis. It has been further found that excellent results with regard to low foam densities are achieved for the preferred foam formulations with as little as 1–3 parts by weight on the same basis of most of the especially preferred hydrolyzable and non-hydrolyzable linear high molecular weight siloxane-polyoxyalkylene block copolymers.

The hydrolyzable and non-hydrolyzable high molecular weight linear siloxane-polyoxyalkylene block copolymers of this invention can be incorporated into the frothing compositions of this invention in undiluted form or, if desired, can be added as a solution in any appropriate inert diluent, such as the inert organic solvents discussed above. Aromatic hydrocarbons such as toluene, xylene and the like, having boiling points in the range of about 105° to 300°C. are preferred. Generally, when used, the solutions contain about 20 to 70 weight per cent of the $(AB)_n$ siloxane-polyoxyalkylene block copolymer. The preferred solution consists of about 35 to 55 weight per cent $(AB)_n$ copolymer and about 65 to 45 weight per cent solvent of choice. The $(AB)_n$ copolymer solutions, based on 50 weight per cent active copolymer are useful in the froth urethane foam stabilization in concentrations preferably ranging from about 0.5 to 7 parts by weight per hundred weight parts of the active hydrogen component.

The polyisocyanate components employed in this invention for mixing with active hydrogen compounds to form the liquid phase of the novel froths preferably are those having the general formula

$$Q(NCO)_i$$

wherein $i$ is an integer of two or more and Q is an organic radical having the valence of $i$. Q can be a substituted or unsubstituted hydrocarbon group (e.g., an alkylene or an arylene group). Q can be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diiisocyanate, 1,8-diisocyanato-p-menthane, xylylene diisocyanate, (OCNCH$_2$CH$_2$CH$_2$OCH$_2$)$_2$0,1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, and isopropylbenzene-alpha-4-diisocyanate.

Q can also represent a polyurethane radical having a valence of $i$ in which case $Q(NCO)_i$ is a composition conventionally known as a prepolymer. Such prepolymes are formed by reacting a stoichiometric excess of a polyisocyanate as set forth hereinbefore and hereinafter with an active hydrogen-containing component as set forth hereinafter, especially the polyhydroxyl containing materials or polyols described below. Usually, for example, the polyisocyanate is employed in proportions of from about 30 per cent to about 200 percent stoichiometric excess, the stoichiometry being based upon equivalents of isocyanate group per equivalent of hydroxyl in the polyol.

Further included among the isocyanates useful in this invention are dimers and trimers of isocyanates and diisocyanates and polymeric diisocyanates such as those having the general formula

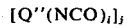

in which $i$ and $j$ are each integers of two or more, and $Q''$ is a polyfunctional organic radical, and/or, as additional components in the mixtures, compounds of the general formula

in which is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; isocyanates derived from sulfonamides $(QSO_2NCO)$, cyanic acid, and thiocyanic acid.

More specifically, the polyisocyanate component employed in the polyurethane-foaming froths of this invention also include the following specific compounds as well as mixtures of two or more of them; 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of anilineformaldehyde condensation products, dianisidine diisocyanate, toluidine diisocyanate, xylylene diisocyanate, bis(2-isocyanatoethyl) fumarate, bis(2-isocyanatoethyl) carbonate, 1,6-hexamethylenediisocyanate, 1,4-tetramethylene-diisocyanate, 1,10-decamethylene-diisocyanate, cumene-2,4-diisocyanate, 4-methoxy-1,3-phenylene-diisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenyl-ether, 5,6-dimethyl-1,3-phenylenediisocyanate, 2,4-dimethyl-1,3-phenylenediisocyanate, 4,4'-diisocyanatodiphenylether, bis 5,6-(2-isocyanatoethyl)bicyclo[2.2.1]hept-2-ene, benzidinediisocyanate, 4,6-dimethyl-1,3-phenylenediisocyanate, 9.10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluene-triisocyanate, and many other organic polyisocyanates that are known in the art, such as those that are disclosed in an article by Siefken, Ann. 562, 75 (1949). In general, the aromatic polyisocyanates are preferred because of their greater reactivity.

It is also often of considerable advantage to block the isocyanate groups of the polyisocyanates listed above with a monofunctional organic compound such as a phenol as described in Annalen, Volume 262, pages 205 to 229, Reinhold Plastics Applications Series on Polyurethanes by Bernard A. Dombrow, published by Reinhold Publishing Corporation, New York, 1957; and Polyurethanes Chemistry and Technology I. Chemistry by Saunders & Frisch, pages 118 to 121, published by Interscience in 1963. Blocking techniques permit the use of the more highly reactive polyisocyanates and/or to adjust the polymerizing or curing temperature of the froth. One or any number of the isocyanate groups in the polyisocyanate molecule can be blocked to provide the degree of reactivity desired. In addition, catalysts such as those described in Bunge U.S. Pat. No. 2,886,555 can be employed to adjust the splitting or unblocking temperature to that desired.

The amount of polyisocyanate employed will vary slightly depending upon the nature of the polyurethane being prepared. In general, the total —NCO equivalent to total active hydrogen equivalent should be such as to provide a ratio of 0.8 to 2.0 equivalents of —NCO per equivalent of active hydrogen, e.g., hydroxyl hydrogen, of the active hydrogen reactant, and preferably a ratio of about 1.0 to 1.5 equivalents of —NCO per active hydrogen.

The active hydrogen-containing component includes polyhydroxyl-containing materials, such as, the hydroxyl-terminated polyhydrocarbons (U.S. Pat. No. 2,877,212); hydroxyl-terminated poly-formals (U.S. Pat. No. 2,870,097); fatty acid triglycerides (U.S. Pat. No. 2,833,730 and 2,787,601); hydroxyl-terminated polyesters (U.S. Pats. No. 2,698,838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pats. No. 2,911,390 and 2,902,473); polyalkyleneether glycols (U.S. Pat. No. 2,808,991; British Pat. No. 733,624); polyalkylenearyleneether glycols (U.S. Pat. No. 2,808,391); polyalkylenether triols (U.S. Pat. No. 2,866,744).

Especially preferred polyhydroxyl-containing materials are the polyether polyols obtained by the chemical addition of alkylene oxides, such as, ethylene oxide, propylene oxide and mixtures thereof, to water or polyhydric organic compounds, such as, ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol (2-hydroxyethoxy) 1-propanol, 4-(2-hydroxyethoxy) 1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy) methyl]-1,3-propanediol, 3-(o-propenylphenoxy)1,2-propanediol, 2,2'-diisopropylidenebis(p-phenyleneoxy)diethanol, glycerol, 1,2,6-hexanetriol, 1,1,1,-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[(2-hydroxyethoxy)-methyl]ethane, 1,1,1-tris[(2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, caprolactone and the like. The alkylene oxides employed in producing polyoxyalkylene polyols normally have from 2 to 4 carbon atoms. Propylene oxide and mixtures of propylene oxide with ethylene oxide are preferred. The polyols listed above can be used per se as the active hydrogen compound.

A preferred class of polyether polyols employed in this invention can be represented generally by the following formula:

wherein R is hydrogen or a polyvalent hydrocarbon radical; a is an integer (e.g., 1 or 2 to 6 to 8) equal to the valence of R, n in each occurrence is an integer from 2 to 4 inclusive (preferably 3) and z in each occurrence is an integer having a value of from 2 to about 200, preferably from 15 to about 100.

Additional active hydrogen-containing materials are the polymers of cyclic esters having a reduced viscosity value of at least about 0.15, and desirably from about 0.2 to about 15, and higher. The preferred polymers of cyclic esters have a reduced viscosity value of from about 0.3 to about as 10. These polymers are homopolymers or copolymers characterized ad containing units of the formula

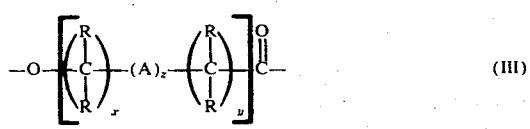

wherein each R, individually, is hydrogen, alkyl, halo, or alkoxy; wherein A is the oxy group, wherein $x$ is an integer from 1 to 4; wherein $y$ is an integer from 1 to 4; wherein $z$ is an integer of zero or one; the sum of $x + y + z$ is at least 2 and not greater than 6; and the total number of R groups which are substituents other than hydrogen does not exceed 3, preferably does not exceed 2. Illustrative R groups include methyl, ethyl, isopropyl, n-butyl, sec-butyl, t-butyl, hexyl, chloro, bromo, iodo, methoxy, ethoxy, n-butoxy, n-hexoxy, 2-ethyl-hexoxy, dodecoxy, and the like. It is preferred that each R individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed eight.

In one embodiment, preferred polymers of cyclic esters contain both recurring structural Unit (III) and units of the formula

wherein each R', individually, is hydrogen, alkyl, cycloalkyl, aryl, or chloroalkyl, or in which the two R' variables together with the ethylene moiety of the oxyethylene chain of Unit (IV) form a saturated cycloaliphatic hydrocarbon ring having from 4 to 8 carbon atoms, desirably from 5 to 6 carbon atoms and w is an integer of 1 to more, preferably 1 to 10. It is preferred that recurring Unit II contain from 2 to 12 carbon atoms.

Illustrative R' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The aforedescribed recurring Unit (III) is interconnected through the oxy group (—O—) of one unit with the carbonyl

of a second unit, i.e., the interconnection does not involve the direct bonding of two carbonyl groups,

On the other hand, the relatively low molecular weight cyclic ester polymers, e.g., those having reduced viscosity values below about 0.3 are characterized by end groups which can be hydroxyl or carboxyl. Cyclic ester polymers having an average molecular weight of about 500 to about 2000 are preferred for use herein.

The preparation of the cyclic ester polymers is well documented in the patent literature as exemplified by U.S. Pat. Nos. 3,021,309 through 3,021,317; 3,169,945; and 2,962,524. Briefly, the process involves the polymerization of a mixture containing at least one cyclic ester monomer with or without a functional initiator therefor such as the polyols described hereinbefore and in the patents mentioned above, and a suitable catalyst, the choice of which will depend on the presence or absence of an initiator. Suitable cyclic ester monomers which can be employed in the manufacture of the cyclic ester polymers are best illustrated by the following formula:

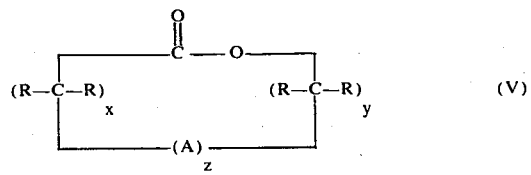

wherein the R, A, $x$, and $z$ variables have the significance noted in Unit (III) supra. Representative cyclic ester monomers which are contemplated include, for example, delta-valerolactone; epsilon-caprolactone, beta-enantholactone; the monoalkyl-delta-valerolactones, e.g., the monoethyl-, monoethyl-, monohexyl-, delta-valerolactones, and the like. In the absence of added functional initiator, the polymerization process is desirably effected under the operative conditions and, as noted in U.S. Pat. Nos. 3,021,309 through 3,021,317, in the presence of anionic catalysts. When reacting a mixture containing cyclic ester monomer and functional initiator which possesses at least one active hydrogen substituent, e.g., carboxyl or hydroxyl, it is desirable to use the catalysts noted in U.S. Pat. Nos. 2,878,236, 2,890,208, 3,169,945 and 3,284,417, under the operative conditions discussed therein. Suitable polyol initiators and polycarboxylic acid initiators are those listed in U.S. Pat. No. 3,169,945 and other of the patents enumerated herein as well as those polyols and polycarboxylic compounds listed hereinbefore.

Polymers of cyclic esters can also be manufactured via the process described in U.S. Pat. No. 2,962,524.

Cyclic ester/alkylene oxide copolymers can also be prepared by reacting a mixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30°C of from about 0.3 to about 1.0), in the presence of an inert normally-liquid saturated aliphatic hydrocarbon vehicle such as heptane and phosphorus pentafluoride as the catalyst therefor, at an elevated temperature, e.g., about 80°C. and for a period of time sufficient to produce such cyclic ester/alkylene oxide copolymers.

When the cyclic ester polymers are prepared from a mixture containing the cyclic ester monomer and minor amounts of a cyclic comonomer which is copolymerizable therewith, e.g., cyclic carbonates and cyclic ethers, such as, alkylene oxide, oxetane, tetrahydrofuran, etc., the polymeric chain of the resulting copolymeric product will be characterized by both recurring linear Unit (III) supra as well as the recurring linear Unit (IV) (which would represent the alkylene oxide comonomer polymerized therein) and/or by a recurring linear unit which would correspond to the additional polymerizable cyclic comonomer in the monomeric mixture. When the comonomer is an alkylene oxide, the resulting copolymeric product will contain both recurring linear Unit (III) and recurring linear Unit (IV) in the copolymeric chain thereof. The interconnection of linear Unit (III) and linear Unit (IV) supra does not involve or result in the direct bonding of two oxy groups, i.e., —O—O—. In other words, the oxy group (—O—) of recurring linear Unit (IV) is interconnected with the carbonyl group

of recurring linear Unit (III) supra or with the alkylene moiety of a second oxyalkylene Unit (IV).

Polymers of cyclic esters as described above are useful in producing polyurethane articles having comparatively high strength and elongation.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 grams of polymer in 100 milliliters of solvent, e.g., cyclohexanone, benzene, chloroform, toluene, or other common organic solvents, at 30°C.

Another type of active hydrogen-containing materials useful in this invention are the polymer/polyol compositions obtained by polymerizing ethylenically unsaturated monomers in a polyol as described in British Pat. No. 1,063,222 and U.S. Pat. No. 3,383,351, the disclosures of which are incorporated herein by reference. Suitable monomers for producing such compositions include acrylonitrile, vinyl chloride, styrene, butadiene, vinylidene chloride and other ethylenically unsaturated monomers as identified and described in the abovementioned British Patent and U.S. Patent. Suitable polyols include those listed and described hereinabove and in the British Patent and U.S. Patent. The polymer/polyol compositions can contain from about 1 to about 70 weight per cent, preferably about 5 to about 50 weight per cent, and most preferably about 10 to about 40 weight per cent monomer polymerized in the polyol. Such compositions are conveniently prepared by polymerizing the monomers in the selected polyol at a temperature of 40°C. to 150°C. in the presence of a free radical polymerization catalyst, such as, peroxides, persulfates, percarbonate, perborates and azo compounds. Further details of the compositions and methods of making same are described in the abovementioned British Patent and U.S. Patent. The resulting composition is believed to be a complex mixture comprising free polyol, free polymer and graft polymer/polyol complexes. Preparation 1 of the British Patent is especially preferred. Polymer/polyol compositions of this type are useful in producing polyurethane articles having comparatively high load-bearing properties.

Mixtures of the above active hydrogen-containing compounds can be employed as reactants with the polyisocyanate to form polyurethanes. For example, a mixture of a diol such as propylene glycol, polymer/polyol composition and cyclic ester polymer can be employed.

The polyol or polyol mixture employed in this invention can have hydroxyl numbers which vary over a wide range. In general, the hydroxyl numbers of the polyols or mixtures thereof, including other cross-linking additives, if employed, can range from about 28 to about 1000, and higher, preferably from about 75 to about 800.

The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives used in the invention. The hydroxyl number can also be defined by the equation:

$$OH = \frac{56.1 \times 1000 \times f}{m.w.}$$

wherein

OH = hydroxyl number of the polyol.

f = average functionality, that is average number of hydroxyl groups per molecule polyol.

m.w. = average molecular weight of the polyol.

The exact polyol or polyols employed depends upon the end use of the polyurethane foam. The molecular weight and the hydroxyl number are selected properly to result in flexible, semi flexible, or rigid foams. The polyol or polyols including cross-linking additives, if used, preferably possesses a hydroxyl number of from about 200 to about 1000 when employed in rigid foam formulations, from about 100 to about 250 for semi-flexible foams, and from about 28 to about 150 or more when employed in flexible foam formulations. Such limits are not intended to be restrictive, but are merely illustrative of the large number of possible combinations of the polyols that can be employed.

Especially high quality foams have been obtained by employing preferred polyurethane foam - forming ingredient formulations comprising (1) 100 parts by weight of an organic polyol blend consisting essentially of (a) about 20 to about 98 parts by weight of a graft copolymer of about 20 weight per cent acrylonitrile and about 80 weight per cent of a glycerol started propylene oxide adduct triol having a molecular weight of about 3,000 and a hydroxyl number of about 56; the graft copolymer having a hydroxyl number of about 45; (b) about 1 to about 40 parts by weight of a glycerol started propylene oxide adduct triol having a molecular weight of about 700 and a hydroxyl number of about 240; and (c) about 1 to about 40 parts by weight of a poly-$\epsilon$-caprolactone diol having a molecular weight of about 530 and a hydroxyl number of about 212; and (2) a polyisocyanate mixture of about 80 weight per cent of 2,4-tolylene diisocyanate and 20 weight per cent of 2,6-tolylene diisocyanate, said organic polyol blend and said polyisocyanate being present in the formulation in a major amount and in a relative amount sufficient to produce the polyurethane; and (3) a foam stabilizing amount of a high molecular weight linear $(AB)_n$ siloxane-polyoxyalkylene block copolymer as defined herein.

The novel compositions can contain a catalyst and/or a cross-linking agent, preferably, so long as its presence will not initiate substantial polymerization prematurely. Other additives for providing special effects, e.g., coloring agents, fillers, etc., can also be included, preferably, so long as they do not initiate substantial polymerization at ambient temperatures or interfere with froth stability.

The liquid phase is preferably substantially chemically stable and, preferably, does not undergo substantial polymerization when the viscosity of a test admixture containing only the non-frothed mixed polyurethane-forming components, surfactants, and any catalysts composing the liquid phase does not reach about 10,000 centipoises in 2600 seconds when held at a temperature in the range of 24.5 to 25.5°C. The materials are present in the text admixture in the same relative amounts as in the mixture used to produce the froth. The liquid phase can be thus characterized by mixing only those ingredients for about one minute and placing 7.5 ml of it in a Brookfield LVT Viscometer equipped with a jacketed small sample chamber, holding it at a temperature of 24.5° to 25.5°C. and determining its viscosity over the above-specified period of time. The froth is rapidly heat curable when a one-quarter inch thick section of it cures to a tack-free condition within about 30 minutes at about 125°C.

Suitable catalysts include nickel acetylacetonate, more formally known as bis(2,4-pentanedionate) nickel (II), (diacetonitrilediacetylacetonato nickel) and derivatives thereof, such as, diacetonitrilediacetylacetonato nickel, dibenzonitrilediacetylacetonato nickel, bis(triphenylphosphine)-diacetylacetonato nickel and the like. In addition, tin catalysts such as dibutyltin dilaurate can be used advantageously. The amount of such catalyst employed in the liquid phase is preferably in the range of 0.03 to 3.0 weight parts per hundred weight parts of the active hydrogen compound.

Conventional metal catalysts in conventional concentrations also can be used. If desired, the conventional metal catalysts are used in lower than usual concentrations to avoid premature curing. Such catalysts include both inorganic metal compounds and metal compounds which contain organic groups. Particularly useful catalysts are organo-tin compounds. These catalysts can be used each alone or in mixtures with one or more of the others. Among the organo-tin compounds are stannous acylates, such as dialkyl tin salts of carboxylic acids, e.g., dibutyltin dilaurate. Other metal salts such as lead octoate and the like can also be employed.

Other but less preferred latent catalysts which can be employed are the metal diorganodithiocarbamates wherein the organo groups can be, for instance, alkyl groups of up to 18 carbon atoms and preferably from 1 to 8 carbon atoms.

In certain systems, especially those having a high hydroxyl number, no catalyst at all is needed. Certain systems containing no catalysts at all are substantially structurally and chemically stable at ambient temperatures yet are curable by the application of heat at temperatures above about 70°C. The hydroxyl number of one such system preferably exceeds 400. Other non-catalyst systems include those where one of the reactants is catalytic, e.g., where the active hydrogen-containing compound is a strong base.

The liquid phase can contain other ingredients, such as, dyes, fillers, pigments, and other materials for providing desired efects. Small amounts of an auxiliary blowing agent can be employed. For example, high boiling fluorocarbons, e.g., boiling above about 40°C. can be used. Very small amounts of water, i.e., insufficient to bring about any substantial gas evolution, can be employed. Specific fluorocarbons include the Ucon Fluorocarbons and Freons boiling above about 40°C., for example, 1,1,2-trichloro-1,2,2-trifluoroethane and isomers of tetrachlorodifluoroethane, tetrachloromonofluororethane, and the like. The auxiliary agent, although it is not necessary, can be employed for purposes for providing an added expansion during heat curing in those cases where such added expansion is desired.

The gas phase of the novel froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide and even fluorocarbons which are normally gaseous at ambient temperatures.

The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 psig. Higher super atmospheric pressures may also be employed however such is not necessary nor preferred since special equipment must also be used. It is significant to note that in the instant preferred method conventional readily available, mixing equipment is used and no special equipment is necessary.

The amount of inert gas beaten into the liquid phase should be adequate to provide a froth having a density at ambient atmospheric pressure of less than about 45%, preferably less than about 35%, of the density of the liquid phase prior to frothing. The mechanical beating is conducted over a period of a few seconds in an Oakes mixer, or of 3 to 30 minutes in a Hobart mixer, or however long it takes to obtain the desired froth density in the mixing equipment employed.

The froth as it emerges from the mechanical beating operation is preferably substantially chemically stable and is structurally stable but easily workable at ambient temperatures, e.g., about 15°C. to about 30°C. The consistency of the froth closely resembles the consistency of aerosol-dispensed shaving cream and it has a density of less than about 45%, or preferably less than about 35%, of the density of the liquid phase prior to frothing.

The novel froths of this invention find extensive utility in the production of shaped, foamed articles ranging from flexible foamed articles to rigid foamd articles and all degrees of flexibility and rigidity in between. For examples, the novel froths can be molded and subsequently heat cured to form crash padded panels, dashboards, sun-visors, arm-rests and the like for automotive vehicles, airplanes and boats, and can be applied to and cured on the backs of carpeting to provide foam cushion backings or to textile fabrics to provide interlinings for padding and/or thermal insulation purposes.

Because of their substantial chemical and structural stability, the novel froths can be readily shaped by molds or doctor blades. Inasmuch as, in the preferred embodiment, there is no substantial chemical expansion (i.e., expansion due to gas produced in the liquid phase by a chemical reaction) or expansion due to volatilization of a liquid and substantially only thermal expansion taking place during heat curing, dimensional changes are readily predictable and easily controlled. For these reasons, it is also possible to avoid duplication of rough surfaces such as in coating the rough and uneven back sides of carpets. This was not possible through the use of chemically expanded foams. In addition the structural stability, i.e. non-collapse of the froth is maintained during the coating operation which also means that the viscosity of the froth will remain substantially unchanged until cured. Thus the curing, e.g. of a 1 inch coated froth on the backside of a carpet, results in a cured foam having substantially the same height as the coated froth, unless of course some additional foaming ingredient is used which is activated during the curing process.

The present invention now permits the selection of appropriate amounts and types of surfactants which provide an appropriate amount of drainage of the liquid phase, for example, into the interstices of a carpet back. This drainage upon subsequent curing not only locks the foam backing to the carpet but also serves the dual purpose of locking the fibers of the carpet back together. More specifically, this invention also provides a process for providing a second backing on a carpeting material composd of a first backing having a front side faced with fibers which pass through the first backing and which extend beyond the back side to the first backing to mechanically anchor the fibers to the first backing. The process comprises applying to the back side of the first backing and the portion of the fibers extending beyond said back side a substantially uniformly thick layer of a froth of this invention, and curing the froth at a temperature about 70°C. to (a) form a cured polyurethane foam of substantially uniform thickness as an integral second backing on the back side of the first backing and (b) bond the fibers to the first backing. The first backing can be any conventional carpet backing material (e.g., jute or polypropylene) and the fibers can be mechanically anchored to the first backing by any conventional means (e.g, by sewing or needle punching). The fibers can be composed of any conventional carpeting material (e.g., cotton, rayon, wool, nylon, acrylonitrile polymers, vinyl halide polymers, etc). The fibers can be in any suitable form (e.g., in the form of pile yarns threaded through the first backing and having cut or looped pile faces on the front side of the first backing). The froth can be applied to the first backing by any suitable procedure (e.g., knife coating). The second backing can have any desired thickness (e.g., from one-sixteenth to one-half inch).

The novel froth is readily transportable by conveyor, suitable vehicle or piping from the site of its manufacture to the site of its use in coating the backs of carpeting or fabric, or in forming shaped articles by molding, or in coating wire or other articles, or in encapsulation operations.

Such basic mechanical frothing, forming and coating techniques can also be found in U.S. applications, Ser. Nos. 795,406 and 795,674, both filed Jan. 31, 1969, both now abandoned, as well as Ser. No. 887,305 filed Dec. 22, 1969 the entire disclosures of which applications are incorporated herein by reference thereto.

As defined herein, the molecular weights for the various linear $(AB)_n$ polymer compositions of this invention and those given in the following examples were measured by Gel Permeation Chromatography using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. The use of Gel Permeation Chromatography for measuring molecular weights is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore.

In the following examples the procedure described in the article entitled "Characterization of Silicones by Gel Permeation Chromatography" by F. Rodriguez et al. in I & EC PRODUCT AND DEVELOPMENT. Vol. 5, No. 2, Page 121, June 1966 was followed using five styragel packed columns (Waters Associates, Inc.) having a pore size of $3 \times 10^3$ A°, $10^4$ A°, $10^5$ A°, $3 \times 10^5$ A° and $10^6$ A°, respectively.

The following examples illustrate the present invention and are not to be regarded as limitative. It is to be understood that Me represents a methyl radical; G.P.C. designates Gel Permeation Chromatography; and that all of the parts, percentages and proportions referred to herein and in the appended claims are by weight unless otherwise indicated.

EXAMPLE I

This example illustrates the production of a high molecular weight linear non-hydrolyzable siloxanepolyoxyalkylene $(AB)_n$ block copolymer derived from a SiH-terminated-polydimethylsiloxane and an allyl-terminated polyoxyalkylene ether.

Into a 500 ml. three-neck flask, equipped with a mechanical stirrer, condenser, thermometer and nitrogen inlet were placed 54.0 g. (0.02 mole) of allyl-terminated polyoxyethylene-polyoxy-1,2,-propylene comprising 35 percent ethylene oxide by weight and 65 per cent propylene oxide by weight and having an average molecular weight of 2700, 150 ml. of toluene and 20 ppm of Pt as chloroplatinic acid. To this mixture 28.48 g. (0.02 mole) of SiH-endblocked polydimethylsiloxane having an average molecular weight of 1424 was added slowly at such a rate as to maintain the temperature between 80°–100°C. The completion of the reaction was evidenced by a negative $AgNO_3$ test for SiH. The reaction mixture was then neutralized with 10 g. of $NaHCO_3$, filtered and after solvent removal by rotary evaporation at 50°C./1 Hg mm. there was obtained 76.0 g., 93% of the desired $(AB)_n$ block copolymer product. This liquid product has a viscosity of about 12,100 cps at room temperature. Said block copolymer had an average molecular weight of 36,000 as established by GPC and can be represented by the average formula

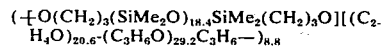

Following the mole to mole reaction procedure outlined in Example 1 above, a series of seven other high molecular weight linear non-hydrolyzable siloxanepolyoxyalkylene $(AB)_n$ block copolymers (Example 2 to 7) were prepared as illustrated in TABLE I below.

ing an average molecular weight of 1241, 109 g. (0.0401 mole) of polyoxyethylene-polyoxy-1,2-propylene glycol comprising 35 weight per cent ethylene oxide and 65 weight per cent propylene oxide and having an average molecular weight of 2715 and 250 g. of Solvesso 100, a mixture of alkylated aromatic hydrocarbons, solvent (b.p. range 155°–173°C.). The molar ratio of dimethylamino-terminated polydimethylsiloxane to polyoxyethylene-polyoxy-1,2-propylene glycol in this reaction mixture amounted to 1.12 to 1. The mixture was heated at 171°C. for 5 hours during which time the dimethylamine that formed was allowed to escape through the head of the column. After this time the concentration of the reaction mixture was adjusted to 50 per cent active solid by addition of more Solvesso 100 solvent. The mixture was then cooled and about a 100% yield of the desired (AB) block copolymer was obtained. Said block copolymer had an average molecular weight of 80,000 as established by GPC, the siloxane blocks (% Silicone of product) constituting about 31.1 weight per cent of the block copolymer. The block copolymer can be represented by the average formula

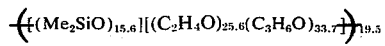

EXAMPLE 9

This example also illustrates the production of a high molecular weight linear hydrolyzable siloxanepolyoxyalkylene $(AB)_n$ block copolymer derived from a dimethylamine-terminated polydimethylsiloxane and a polyoxyalkylene diol.

In a one-liter flask equipped with fractionating column, thermometer, stirrer and a nitrogen inlet tube for sparging there were placed 72.0 g (0.05 mole) of dimethylamino-terminated polydimethylsiloxane having a average weight of 1440, 149.5 g. (0.05 mole) of polyoxyethylene polyoxy-1,2-propylene glycol comprising 50 weight per cent ethylene oxide and 50 weight per cent propylene oxide and having an average molecular weight of 2985 and 217.0 g of xylene. The reaction was stirred vigorously, with constant nitrogen sparge (ca

TABLE I

| | REACTANTS | | | | $(AB)_n$ PRODUCT | |
|---|---|---|---|---|---|---|
| Example No. | Silicone* Avg. Mol. Wt. | Polyether** Avg. Mol. Wt. | Oxyalkylene % Oxyethylene | Content*** % Oxypropylene | GPC Avg. Mol. Wt. | % Silicone of Block Copolymer |
| 1 | 1424 | 2700 | 35 | 65 | 36,000 | 35 |
| 2 | 700 | 2700 | 35 | 65 | 48,000 | 21 |
| 3 | 2300 | 2700 | 35 | 65 | 36,000 | 46 |
| 4 | 1510 | 2940 | 35 | 65 | 38,000 | 34 |
| 5 | 1700 | 3000 | 50 | 50 | 48,000 | 36 |
| 6 | 1700 | 3000 | 50 | 50 | 51,000 | 36 |
| 7 | 1700 | 3000 | 50 | 50 | 56,000 | 36 |

*Silicone Structure $HSiMe_2O(Me_2SiO)_zH$, where z is an integer with values to give the appropriate molecular weights.
**Polyether Structure $CH_2=CHCH_2O(C_2H_4O)_x(C_3H_6O)_yCH_2CH=CH_2$, where x and y are integers with values to give the appropriate molecular weights and oxyalkylene content.
***Oxyalkylene Content Represents the weight percent of ethylene oxide and propylene oxide in the polyether.

EXAMPLE 8

This example illustrates the production of a high molecular weight linear hydrolyzable siloxanepolyoxyalkylene $(AB)_n$ block copolymer derived from a dimethylamine-terminated polydimethylsiloxane and a polyoxyalkylene diol.

In a one-liter flask equipped with fractionating column, thermometer, stirrer and a nitrogen inlet tube for sparging there were placed 52.0 g (0.0451 mole) of dimethylamino-terminated polydimethylsiloxane hav- 0.1 ft. 3/min.), as the temperature of the vessel was brought up to ca. 140°C. over a period of one-half hour. The reaction was not homogeneous in the first 1–2 hours of the reaction time, but became homogeneous as the reaction was progressing with the continuous removal of dimethylamine. The reaction mixture was heated at 140°C. for 44 hours, at this time per cent solid was determined and was found to be 65 per cent. The concentration was adjusted to 50 per cent active solid by addition of xylene solvent. After this operation, the mixture was further sparged at 140°C. for an additional two more hours to help remove trace amounts of trapped dimethylamine. The mixture was then cooled and about a 100% yield of the desired (AB)$_n$ block copolymer was obtained. Said block copolymer had an average molecular weight of 250,000 as established by GPC, the siloxane blocks constituted about 31.3 weight per cent of the block copolymer. Said copolymer also exhibited a 10 per cent aqueous pH of about 7.1. The block copolymer can be represented by the average formula

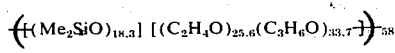

Following the above outlined procedure for producing hydrolyzable (AB)$_n$ block copolymers a series of 17 other high molecular weight linear hydrolyzable siloxane-polyoxyalkylene (AB)$_n$ block copolymers (Examples 10 to 26) were prepared employing the reactants and conditions illustrated in TABLE II below.

The following examples 27 to 29 illustrate the production of linear hydrolyzable (AB)$_n$ siloxanepolyoxyalkylene block copolymers according to teachings of U.S. Pat. No. 3,480,583.

EXAMPLE 27

A hydrolyzable linear (AB)$_n$ block copolymer was prepared according to Example 18 of U.S. Pat. No. 3,480,583 employing 50.0 g. (0.0422 mole) of a $C_2H_5O(Me_2SiO)_{15}C_2H_5$ ethoxy-terminated dimethyl siloxane polymer having an average molecular weight of 1184; 126.0 g. (0.0422 mole) of a $HO(C_2H_4O)_{33.7}(C_3H_6O)_{25.8}H$ polyoxyalkylene diol having an average molecular weight of 2985; 200 g. of xylene and 0.9g. of $CF_3COOH$ catalyst. The average molecular weight of the hydrolyzable linear (AB)$_n$ block copolymer obtained was 30,000 as established by GPC.

TABLE II

| Reactants Silicone* | | | Polyoxyalkylene Diol** | | | Oxyalkylene*** Content | | Reaction Conditions | Product (AB)$_n$ GPC Avg.Mol.Wt. | % Silicon of Product |
|---|---|---|---|---|---|---|---|---|---|---|
| Example No. | Avg.Mol Wt. | Gram | Mole | Avg.Mol Wt. | Gram | Mole | % Oxyethylene | % Oxypropylene | | | |
| 10 | 1241 | 56 | 0.0451 | 2715 | 109 | 0.0401 | 35 | 65 | 190°C., 5 Hours; Solvesso 150 | 100,000 | 31.1 |
| 11 | 1241 | 224 | 0.1805 | 2715 | 436 | 0.162 | 35 | 65 | 192°C.; 6 Hours Solvesso 150 | 175,000 | 31.1 |
| 12 | 1250 | 156.2 | 0.125 | 2670 | 331.5 | 0.124 | 50 | 50 | 180°C.; 2.5 Hours; O-dichlorobenzene | 95,000 | 30.7 |
| 13 | 1250 | 156.2 | 0.125 | 2670 | 331.5 | 0.124 | 50 | 50 | 182°C.; 3 Hours O-dichlorobenzene | 120,000 | 39.2 |
| 14 | 1910 | 86 | 0.045 | 2985 | 134.5 | 0.045 | 50 | 50 | 192°C.; 6 Hours Solvesso 150 | 125,000 | 31.3 |
| 15 | 1440 | 72.2 | 0.050 | 2985 | 149.5 | 0.050 | 50 | 50 | 140°C.; 50 Hours Xylene | 160,000 | 31.3 |
| 16 | 1440 | 72 | 0.050 | 2985 | 149.5 | 0.050 | 50 | 50 | 192°C.; 6 Hours Solvesso 150 | 200,000 | 31.3 |
| 17 | 1440 | 72 | 0.050 | 2680 | 134 | 0.050 | 75 | 25 | 190°C.; 6 Hours Solvesso 150 | 150,000 | 30.6 |
| 18 | 1910 | 86 | 0.045 | 3140 | 141.9 | 0.045 | — | 100 | 192°C.; 6 Hours Solvesso 150 | 92,000 | 37.0 |
| 19 | 1910 | 85.9 | 0.045 | 2650 | 118.8 | 0.0448 | 100 | — | 192°C.; 6 Hours Solvesso 150 | 85,000 | 42.0 |
| 20 | 1140 | 114 | 0.10 | 2670 | 267 | 0.1 | 50 | 50 | 115°C.; 2 Hours Xylene | 5,300 | 30.4 |
| 21 | 1140 | 114 | 0.10 | 2670 | 267 | 0.1 | 50 | 50 | 135°C.; 7 Hours Xylene | 11,500 | 30.4 |
| 22 | 1140 | 114 | 0.10 | 2670 | 267 | 0.1 | 50 | 50 | 138°C.; 8 Hours Xylene | 14,800 | 30.4 |
| 23 | 1140 | 114 | 0.10 | 2670 | 267 | 0.10 | 50 | 50 | 138°C.; 9 Hours Xylene | 22,500 | 30.4 |
| 24 | 1140 | 114 | 0.10 | 2670 | 267 | 0.10 | 50 | 50 | 138°C.; 25 Hours Xylene | 63,000 | 30.4 |
| 25 | 1140 | 114 | 0.10 | 2670 | 267 | 0.10 | 50 | 50 | 138°C.; 27 Hours Xylene | 70,000 | 30.4 |
| 26 | 1140 | 114 | 0.10 | 2670 | 267 | 0.10 | 50 | 50 | 138°C.; 30 Hours Xylene | 90,000 | 30.4 |

*Silicone Structure: $Me_2N(Me_2)SiO(SiMe_2O)_zSi(Me_2)NMe_2$ where z is an integer with values to give the appropriate molecular weights.
**Polyoxyalkylene Diol Structure: $HO-(C_2H_4O)_x(C_3H_6O)_y-H$, where x and y are integers with values to give the appropriate molecular weights.
***Oxyalkylene Content: Represents the weight per cent of ethylene oxide and propylene oxide in the Diol
Solvesso 150: Solvent mixture of Alkylated Aromatic Hydrocarbon Solvents (b.p. range 188–210°C.)

EXAMPLE 28

Example 27 was repeated with the exception that the catalyst employed was now a mixture of 1.0 g. of $CF_3COOH$ and 1.0 g. of $CH_3COOK$. The average molecular weight of the hydrolyzable linear $(AB)_n$ block copolymer obtained was 32,000 as established by GPC.

EXAMPLE 29

A hydrolyzable linear $(AB)_n$ block copolymer was prepared according to Example 18 of U.S. Pat. No. 3,480,583 employing 50.0 g. (0.0422 mole) of a $C_2H_5O(Me_2SiO)_{15} C_2H_5$ ethoxy-terminated dimethyl siloxane polymer having an average molecular weight of 1184; 25.5 g. (0.0422 mole) of a $HO(C_2H_4O)_{13.3}H$ polyoxyalkylene diol having an average molecular weight of 605; 100 g. of xylene and 0.5 g. of $CF_3COOH$ catalyst. The average molecular weight of the hydrolyzable linear $(AB)_n$ block copolymer obtained was 35,000 as established by GPC.

EXAMPLE 30

Thirty-two siloxane-polyoxyalkylene block copolymers were tested for froth stabilization of a polyurethane foam forming system. The mixtures were mechanically frothed in a 5-quart Hobart N-50 mixer using a D-wire whip for a reasonable time as specified in TABLE III below. The polyurethane foam forming systems were prepared from the following ingredients.

| Ingredients | Parts by Weight |
|---|---|
| Polyol Bend* | 100 |
| TDI** | 22.3 |
| TMBDA*** | 0.1 |
| Nickel Acetylacetonate | 0.2 |

Surfactant (as listed in Table III) varied
*The polyol blend had the following formulation

| | Parts by Weight |
|---|---|
| Polyol[1] | 55 |
| Polyol[2] | 20 |
| Polyol[3] | 25 |

Polyol[1] is a graft copolymer of about 20 weight per cent acrylonitrile and about 80 weight per cent of a glycerol started propylene oxide adduct triol having a molecular weight of about 3,000 and a hydroxyl number of about 56; the graft copolymer having a hydroxyl number of about 45.

Polyol[2] is a glycerol started propylene oxide adduct triol having a molecular weight of about 700 and a hydroxyl number of about 240.

Polyol[3] is a poly-ε-caprolactone diol having a molecular weight of about 530 and a hydroxyl number of about 212.

**TDI as used herein designates a mixture of about 80 weight per cent of 2,4-tolylene diisocyanate and about 20 weight per cent of 2,6-tolylene diisocyanate.

***TMBDA: N,N,N',N'-Tetramethyl-1,3,Butanediamine.

The surfactants as listed in TABLE III below are based on 100 per cent active copolymers. In practice 50 per cent active surfactant solutions were used (except for surfactants 32 and 33) in the solvents in which they were prepared. For example surfactants 1 to 7 (Table I) in toluene, Surfactants 8 to 26 (Example 8 to 9 and Table II as specified); and surfactants 27 to 29 in xylene.

A number of the froths were also cured to produce a tack free polyurethane foam having the densitites listed in TABLE III below within 10 minutes at 125°C.

TABLE III

| Run No. | Surfactant Used | | Surfactant Concentration Parts by Weight | Froth Density lb/ft³ | Frothing Time (min.) | Froth Stability | Foam Density lb/ft³ |
|---|---|---|---|---|---|---|---|
| 1 | Example | 1 | 6 | 15 | 10 | Stable | 13 |
| 2 | " | 2 | 6 | ~ 40 | 10 | Fair | |
| 3 | " | 3 | 6 | ~ 30 | 10 | Fair | |
| 4 | " | 4 | 3 | 22 | 10 | Stable | 18 |
| 5 | " | 5 | 2 | 19 | 10 | Stable | 15 |
| 6 | " | 6 | 2 | 18 | 10 | Stable | 15 |
| 7 | " | 7 | 2 | 13 | 10 | Stable | 10 |
| 8 | " | 8 | 2 | 21.6 | 10 | Stable | 16 |
| 9 | " | 8 | 4 | 14 | 10 | Stable | 10 |
| 10 | " | 9 | 2 | 12 | 10 | Stable | 8.9 |
| 11 | " | 10 | 2 | 15 | 10 | Stable | 11 |
| 12 | " | 11 | 2 | 13.5 | 10 | Stable | 9.5 |
| 13 | " | 11 | 1 | 21 | 10 | Stable | |
| 14 | " | 12 | 2 | 12 | 9 | Stable | 9 |
| 15 | " | 12 | 1 | 17 | 10 | Stable | 13 |
| 16 | " | 13 | 2 | 12 | 8 | Stable | |
| 17 | " | 13 | 1 | 14 | 10 | Stable | 10 |
| 18 | " | 14 | 2 | 13 | 8 | Stable | 9 |
| 19 | " | 15 | 2 | 13 | 10 | Stable | 9 |
| 20 | " | 16 | 2 | 12 | 8 | Stable | |
| 21 | " | 16 | 1 | 13 | 10 | Stable | 8.6 |
| 22 | " | 17 | 2 | 13 | 10 | Stable | 9.1 |
| 23 | " | 18 | 2 | ~ 30 | 10 | Fair | |
| 24 | " | 19 | 2 | ~ 35 | 10 | Fair | |
| 25 | " | 20 | 4 | over 40 | 10 | Fair | |
| 26 | " | 21 | 4 | 26 | 10 | Fair | |
| 27 | " | 22 | 4 | 24 | 10 | Fair | |
| 28 | " | 23 | 4 | 22 | 10 | Good | 17 |
| 29 | " | 24 | 4 | 19 | 10 | Good | |
| 30 | " | 25 | 4 | 16 | 10 | Stable | |
| 31 | " | 26 | 4 | 13 | 10 | Stable | 9.3 |
| 32 | " | 27 | 2 | over 35 | 10 | Fair | |
| 33 | " | 28 | 2 | over 35 | 10 | Fair | |
| 34 | " | 29 | 2 | over 35 | 10 | Fair | |
| 35 | " | 31* | 2 | over 35 | 10 | Fair | |
| 36 | " | 32** | 2 | over 35 | 10 | Fair | |
| 37 | " | 33*** | 2 | ~ 30 | 10 | Fair | |

*The surfactant employed as Example No. 31 in Run No. 35 above was a siloxane-oxyalkylene block copolymer having the average formula

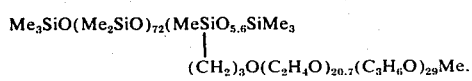

$$Me_3SiO(Me_2SiO)_{72}(MeSiO_{5.6}SiMe_3$$
$$|$$
$$(CH_2)_3O(C_2H_4O)_{20.7}(C_3H_6O)_{29}Me.$$

TABLE III-continued

| Run No. | Surfactant Used | Surfactant Concentration Parts by Weight | Froth Density lb/ft³ | Frothing Time (min.) | Froth Stability | Foam Density lb/ft³ |
|---|---|---|---|---|---|---|

**The surfactant employed as Example No. 32 in Run No. 36 above was a siloxane-oxyalkylene block copolymer having the average formula

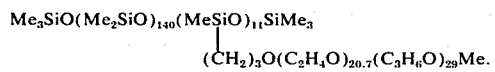

***The surfactant employed as Example No. 33 in Run No. 37 above was a siloxane-oxyalkylene block copolymer having the average formula

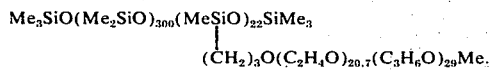

EXAMPLE 34

Three mixtures were prepared from the following polyurethane foam forming formulations:

| Ingredients | Parts by Weight |
|---|---|
| Polyol Blend* | 100 |
| TDI** | 22.3 |
| TMBDA*** | 0.1 |
| Nickel Acetylacetonate | 0.2 |
| Calcium Carbonate | 100 |
| Surfactant**** | varied |

Polyol Blend* same as in Example 30;
TDI** same as in Example 30;
TMBDA*** same as in Example 30;
Surfactant**** The surfactant used in mixture A was a linear hydrolyzable $(AB)_n$ siloxane-polyoxyalkylene block copolymer prepared as described above from a $Me_2NSiMe_2O(Me_2SiO)_{14}SiMe_2NMe_2$ siloxane (Avg. Mol. Wt. 1241) and a $HO(C_2H_4O)_{21.4}(C_3H_6O)_{30.3}H$ polyoxyalkylene diol (Avg. Mol. Wt. 2715) in solvesso 150. The $(AB)_n$ block copolymer product had an average molecular weight of 105,000 as established by GPC.

The surfactant used in mixture B was the same as that of Example 12 in Table II above.

The surfactant used in mixture C was a linear hydrolyzable $(AB)_n$ siloxane-polyoxyalkylene block copolymer prepared as described above from a $Me_2N$-$SiMe_2O(Me_2SiO)_{16.5}$ $SiMe_2NMe_2$ siloxane (Avg. Mol. Wt. 1440) and a $HO(C_2H_4O)_{33.8}$ $(C_3H_6O)_{25.6}H$ polyoxyalkylene diol (Avg. Mol. Wt. 2985) in xylene. The $(AB)_n$ block copolymer product had an average molecular weight of 250,000 as established by GPC.

Each mixture A, B and C was mechanically frothed using an Oakes mixer on a continuous basis. Thus the mixture of ingredients as described above was fed into the Oakes mixer through one pipe while air under pressure (about 70–30 p.s.i. back pressure) was fed into the mixer through another pipe. The resulting froth produced from the mixture and air in the Oakes mixer was transported to a carpet backing operation where the froth was evenly knife-coated on the back of the carpet to a height of about one-sixteenth to one-fourth inch. Each froth was found to be stable both structurally and chemically for at least one hour and cured to a tack-free high quality polyurethane foam having the densities listed in Table IV below within less than about 10 minutes at 125°C.

TABLE IV

| Mixture | Froth Density lb/ft³ | Foam Density lb/ft³ |
|---|---|---|
| A | 19 | 17 |
| B | 20 | 17 |
| C | 20 | 18 |

Various modifications and variations of this invention will be obvious to a worker skilled in the art and it is to be understood that such modifications and variations are to be included within the purview of this application and the spirit and scope of the appended claims.

What is claimed is:

1. A high molecular weight linear non-hydrolyzable siloxane-polyoxyalkylene block copolymer having the average formula

wherein R represents a monovalent hydrocarbon radical free from aliphatic unsaturation; $n$ is an integer of from 2 to 4 inclusive; $a$ is an integer of at least 6; $y$ is an integer of at least 4; $d$ is an integer of at least 4; Y represents a divalent organic group selected from the class consisting of —R'—, —R'CO— —R'NHCO—, —R'—NHCONH—R''—NHCO— and —R'—OOCN-H—R''—NHCO— wherein R' is a divalent alkylene radical and R'' is R' or a divalent arylene group; wherein the average molecular weight of each siloxane block ranges from about 500 to about 10,000; wherein the average molecular weight of each polyoxyalkylene block ranges from about 300 to about 10,000; wherein the siloxane blocks constitute about 20 to about 50 weight percent of the copolymer; wherein the polyoxyalkylene blocks constitute about 80 to about 50 weight percent of the copolymer; and wherein the block copolymer has an average molecular weight of at least about 30,000.

2. A non-hydrolyzable siloxane-polyoxyalkylene block copolymer as defined in claim 1, wherein R is a lower alkyl radical; wherein $(C_nH_{2n}O)$ represents a mixture consisting of about 30 to about 75 weight per cent of oxyethylene groups and about 70 to about 25 weight per cent of oxypropylene groups; wherein Y represents a divalent alkylene group; and wherein the average molecular weight of each siloxane block constitutes about 25 to about 50 weight per cent of the copolymer and the average molecular weight of the polyoxyalkylene block constitutes about 75 to about 50 weight per cent of the copolymer.

3. A non-hydrolyzable siloxane-polyoxyalkylene block copolymer as defined in claim 2, wherein R is methyl.

4. A non-hydrolyzable siloxane-polyoxyalkylene block copolymer as defined in claim 2, wherein Y is a —$CH_2CH_2CH_2$— radica.

5. A non-hydrolyzable siloxane-polyoxyalkylene block copolymer as defined in claim 2, wherein the average molecular weight of each siloxane block ranges from about 30 to about 45 and the average molecular weight of each polyoxyalkylene block ranges from about 70 to about 55.

6. A non-hydrolyzable siloxane block copolymer as defined in claim 5, wherein R is methyl and Y is a —$CH_2CH2CH_2$— radical.

7. A non-hydrolyzable siloxane-polyoxyalkylene block copolymer as defined in claim 6, wherein the average molecular weight of each siloxane block ranges from about 500 to about 5000 and the average molecular weight of each polyoxyalkylene block ranges from about 1000 to about 5000.

8. A non-hydrolyzable siloxane-polyoxyalkylene block copolymer as defined in claim 6, wherein the average molecular weight of each siloxane ranges from about 1000 to about 3,500 and wherein the average molecular weight of each polyoxyalkylene block ranges from about 2000 to about 3,500.

9. A non-hydrolyzable siloxane polyoxyalkylene block copolymer as defined in claim 8, wherein ($C_nH_{2n}O$) represents a mixture consisting of about 50 weight per cent oxyethylene groups and about 50 weight per cent of oxypropylene groups.

10. A non-hydrolyzable siloxane-polyoxyalkylene block copolymer as defined in claim 8, wherein the block copolymer has an average molecular weight ranging from about 30,000 to about 60,000.

* * * * *